United States Patent
Zhu et al.

(10) Patent No.: US 11,395,129 B2
(45) Date of Patent: Jul. 19, 2022

(54) VIRTUAL SIM CARD ACQUISITION METHOD, SUBSCRIBER TERMINAL AND SERVER

(71) Applicant: SHENZHEN UCLOUDLINK NEW TECHNOLOGY CO., LTD., Shenzhen (CN)

(72) Inventors: Youcai Zhu, Shenzhen (CN); Jingbing Chen, Shenzhen (CN); Zhihui Gong, Shenzhen (CN)

(73) Assignee: SHENZHEN UCLOUDLINK NEW TECHNOLOGY CO., LTD., Shenzhen (CN)

( * ) Notice: Subject to any disclaimer, the term of this patent is extended or adjusted under 35 U.S.C. 154(b) by 143 days.

(21) Appl. No.: 16/889,792

(22) Filed: Jun. 1, 2020

(65) Prior Publication Data
US 2021/0176623 A1    Jun. 10, 2021

Related U.S. Application Data

(63) Continuation-in-part of application No. PCT/CN2019/123621, filed on Dec. 6, 2019.

(51) Int. Cl.
| H04W 8/18 | (2009.01) |
| H04W 8/24 | (2009.01) |
| H04W 88/06 | (2009.01) |
| H04W 4/60 | (2018.01) |

(52) U.S. Cl.
CPC ............. *H04W 8/183* (2013.01); *H04W 4/60* (2018.02); *H04W 8/24* (2013.01); *H04W 88/06* (2013.01)

(58) Field of Classification Search
CPC ......... H04W 8/24; H04W 4/183; H04W 4/50; H04W 4/60; H04W 4/80; H04W 8/06; H04W 8/18; H04W 88/06
See application file for complete search history.

(56) References Cited

U.S. PATENT DOCUMENTS

| | | | |
|---|---|---|---|
| 2015/0215773 A1* | 7/2015 | Bai | H04M 17/02 455/418 |
| 2018/0220293 A1* | 8/2018 | Huang | H04W 8/183 |
| 2018/0242138 A1* | 8/2018 | Chen | H04W 8/205 |
| 2020/0382928 A1* | 12/2020 | Obaidi | H04W 4/60 |
| 2020/0389775 A1* | 12/2020 | Ravichandran | H04W 12/06 |
| 2020/0396596 A1* | 12/2020 | Wang | H04W 4/60 |
| 2021/0321358 A1* | 10/2021 | Min | H04W 60/00 |

\* cited by examiner

*Primary Examiner* — Thanh C Le
(74) *Attorney, Agent, or Firm* — Robert L. Stearns; Dickinson Wright, PLLC (57) ABSTRACT

A virtual SIM card acquisition method, including: using a first SIM card to register a wireless network and establishing a connection with a server through a packet data service of the wireless network; sending a virtual SIM card acquisition request to the server based on the connection between the subscriber terminal and the server; receiving the virtual SIM card data sent from the server and acquiring connectable carrier information of the virtual SIM card; and sending the virtual SIM card acquisition request to the server again if the connectable carrier information of the virtual SIM card is inconsistent with the carrier information of the roaming area of the first SIM card, and completing acquisition of the virtual SIM card when the connectable carrier information of the virtual SIM card is consistent with the carrier information of the roaming area of the first SIM card.

15 Claims, 7 Drawing Sheets

VIRTUAL SIM CARD ACQUISITION METHOD, SUBSCRIBER TERMINAL AND SERVER

CROSS-REFERENCE TO RELATED APPLICATION

The present application is a Continuation-in-Part of PCT Patent Application Ser. No. PCT/CN2019/123621, filed on Dec. 6, 2019, the entire disclosure of which is incorporated herein by reference in their entirety.

TECHNICAL FIELD

The present disclosure belongs to the technical field of communications, and particularly relates to a virtual SIM card acquisition method, a virtual SIM card acquisition device, and a subscriber terminal.

BACKGROUND

Roaming function of subscriber terminal is a very common function in daily life.

In order to solve the problem that high cost is paid for the roaming function, "cloud card" service comes into being. The "cloud card" is a virtual SIM card, and the virtual SIM card may be card number resource of a carrier in a roaming area, and cost due to the roaming function won't occur accordingly. However, in the conventional techniques, connectable carrier information of a virtual SIM card may not always be ensured to be consistent with the carrier information of the roaming area of the SIM card due to the occurrence of conditions such as a server matching error, and the like.

TECHNICAL PROBLEM

The embodiments of the present disclosure provide a virtual SIM card acquisition method and device, which may solve a technical problem that connectable carrier information of a virtual SIM card is not always ensured to be consistent with the carrier information of a roaming area of a SIM card.

TECHNICAL SOLUTION

In order to solve the technical problem as mentioned above, the technical solutions adopted by the embodiments of the present disclosure are as follows:

In one aspect, the embodiments of the present disclosure provide a virtual SIM card acquisition method, including:

using a first SIM card to register a wireless network and establishing a connection with a server through a packet data service of the wireless network by a subscriber terminal;

sending a virtual SIM card acquisition request to the server based on the connection between the subscriber terminal and the server by the subscriber terminal; where the virtual SIM card carries carrier information of a roaming area of the first SIM card; the virtual SIM card acquisition request is used for instructing the server to search whether there exists virtual SIM card data corresponding to the carrier information of the roaming area of the first SIM card in the server according to the virtual SIM card acquisition request, and send the virtual SIM card data to the subscriber terminal when there exists the virtual SIM card data corresponding to the carrier information of the roaming area of the first SIM card in the server;

receiving the virtual SIM card data sent from the server, and acquiring connectable carrier information of the virtual SIM card according to the virtual SIM card by the subscriber terminal; and sending the virtual SIM card acquisition request to the server again if the connectable carrier information of the virtual SIM card is inconsistent with the carrier information of the roaming area of the first SIM card, and completing acquisition of the virtual SIM card in the event that the connectable carrier information of the virtual SIM card is consistent with the carrier information of the roaming area of the first SIM card.

In a second aspect, the embodiments of the present disclosure provide a virtual SIM card acquisition method being applied in a server, including:

acquiring, by a server, a virtual SIM card acquisition request sent by a subscriber terminal, where the virtual SIM card acquisition request carries carrier information of a roaming area of a first SIM card;

searching whether there exists a virtual SIM card data of a virtual SIM card corresponding to the carrier information of the roaming area of the first SIM card according to the virtual SIM card acquisition request by the server; and sending, if there exists virtual SIM card data of the virtual SIM card corresponding to the carrier information of the roaming area of the first SIM card in the server, the virtual SIM card data of the virtual SIM card corresponding to the carrier information of the roaming area of the first SIM card in the server to the subscriber terminal.

In a third aspect, the embodiments of the present disclosure provide a subscriber terminal, including a SIM card, a memory, a processor and a computer program stored in the memory and executable by the processor, where the processor is configured to, when executing the computer program, implement following method steps:

using a first SIM card to register a wireless network and establishing a connection with a server through a packet data service of the wireless network by a subscriber terminal;

sending a virtual SIM card acquisition request to the server based on the connection between the subscriber terminal and the server by the subscriber terminal; where the virtual SIM card carries carrier information of a roaming area of the first SIM card; the virtual SIM card acquisition request is used for instructing the server to search whether there exists virtual SIM card data corresponding to the carrier information of the roaming area of the first SIM card in the server according to the virtual SIM card acquisition request, and send the virtual SIM card data to the subscriber terminal when there exists the virtual SIM card data corresponding to the carrier information of the roaming area of the first SIM card in the server;

receiving the virtual SIM card data sent from the server, and acquiring connectable carrier information of the virtual SIM card according to the virtual SIM card by the subscriber terminal; and sending the virtual SIM card acquisition request to the server again if the connectable carrier information of the virtual SIM card is inconsistent with the carrier information of the roaming area of the first SIM card, and completing acquisition of the virtual SIM card in the event that the connectable carrier information of the virtual SIM card is consistent with the carrier information of the roaming area of the first SIM card.

In a fourth aspect, the embodiments of the present disclosure provide a server, including a memory, a processor and a computer program stored in the memory and executable by the processor, where the processor is configured to, when executing the computer program, implement following method steps:

acquiring, by the server, a virtual SIM card acquisition request sent from a subscriber terminal, wherein the virtual SIM card acquisition request carries carrier information of a roaming area of a first SIM card;

searching whether there exists virtual SIM card data of a virtual SIM card corresponding to the carrier information of the roaming area of the first SIM card in the server according to the virtual SIM card acquisition request; and sending the virtual SIM card data of the virtual SIM card corresponding to the carrier information of the roaming area of the first SIM card in the server to the subscriber terminal, if there exists the virtual SIM card data of the virtual SIM card corresponding to the carrier information of the roaming area of the first SIM card in the server.

In a fifth aspect, the embodiments of the present disclosure provide a computer readable storage medium, the computer readable storage medium stores a computer program, when the computer program is executed by a processor, steps in the virtual SIM card acquisition method in the aforesaid first aspect or the second aspect are implemented.

ADVANTAGEOUS EFFECTS

The embodiments of the present disclosure have advantageous effects as compared to the prior art, which are as follows: in the present disclosure, the wireless network is registered by the subscriber terminal using the embedded first SIM card, the connection is established with the server according to the packet data service of the wireless network; a virtual SIM card acquisition request is sent to the server by the subscriber terminal based on the connection between the subscriber terminal and the server; the virtual SIM card data sent from the server is received, and the connectable carrier information of the virtual SIM card is acquired according to the virtual SIM card data; the virtual SIM card acquisition request is sent to the server again if the connectable carrier information of the virtual SIM card is inconsistent with the carrier information of the roaming area of the first SIM card, the acquisition of the virtual SIM card is completed in the event that the connectable carrier information of the virtual SIM card is consistent with the carrier information of the roaming area of the first SIM card. According to the virtual SIM card acquisition method mentioned above, different virtual SIM cards are repeatedly acquired from the server until the connectable carrier information of the virtual SIM card is consistent with the carrier information of the roaming area of the SIM card, so that the connectable carrier information of the virtual SIM card is ensured to be consistent with the carrier information of the roaming area of the SIM card.

BRIEF DESCRIPTION OF THE DRAWINGS

In order to explain the embodiments of the present disclosure more clearly, a brief introduction regarding the accompanying drawings that need to be used for describing the embodiments of the present disclosure or the prior art is given below; it is apparent that the accompanying drawings described as follows are only some embodiments of the present disclosure, the person of ordinary skill in the art may also acquire other drawings according to the current drawings on the premise of paying no creative labor.

DESCRIPTION OF THE EMBODIMENTS

In the following descriptions, in order to describe rather than limiting the present disclosure, concrete details such as specific system structure, technique, and so on are proposed, thereby facilitating comprehensive understanding of the embodiments of the present disclosure. However, it will be apparent to the ordinarily skilled one in the art that, the present disclosure may also be implemented in some other embodiments without these concrete details. In some other conditions, detailed explanations of method, circuit, device and system well known to the public are omitted, so that unnecessary details that obstruct the description of the present disclosure may be prevented.

A roaming function of a subscriber terminal is a very common function in daily life.

In order to solve the problem of high cost in roaming function, "cloud card" service comes into being. The "cloud card" is a virtual SIM (Subscriber Identity Module) card, and the virtual SIM card may be card number resources of a roaming area, as a consequence, cost incurred due to roaming function won't occur. However, in the conventional techniques, connectable carrier information of the virtual SIM card may not always be ensured to be consistent with the carrier information of the roaming area of the SIM card due to the occurrence of conditions such as a server matching error, and the like.

In view of the above, the embodiments of the present disclosure provide a virtual SIM card acquisition method, a virtual SIM card acquisition device, a subscriber terminal and a computer readable storage medium, which may solve the technical problem that the connectable carrier information of the virtual SIM card may not be ensured to be consistent with the carrier information of the roaming area of the SIM card.

The virtual SIM card acquisition method provided by the embodiments of the present disclosure may be applied to a subscriber terminal such as a mobile phone, a tablet computer, a wearable device, a vehicle-mounted device, an AR (Augmented Reality)/VR (Virtual Reality) device, a notebook computer, an UMPC (Ultra-Mobile Personal Computer), a netbook, a PDA (Personal Digital Assistant), and the like, a specific type of the subscriber terminal is not limited by the embodiments of the present disclosure.

Figure 1:
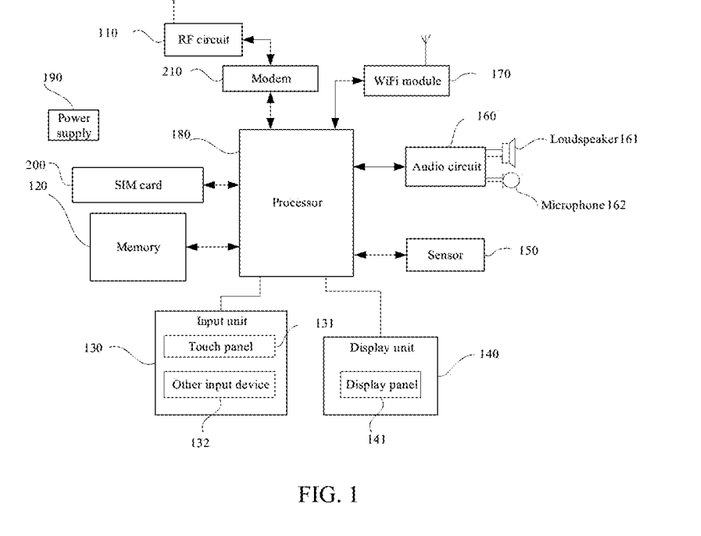
FIG. 1 is a schematic view illustrating a block diagram of a part of structure of a mobile phone provided by an embodiment of the present disclosure.

Taking the subscriber terminal serving as a mobile phone as an example, FIG. 1 illustrates a structural block diagram of a part of the structure of the mobile phone provided by an embodiment of the present disclosure. Referring to FIG. 1, the mobile phone includes a RF (Radio Frequency) circuit 110, a memory 120, an input unit 130, a display unit 120, a sensor 150, an audio frequency circuit 160, a Wi-Fi (Wireless Fidelity) module 170, a processor 180, a power supply 190, a SIM (Subscriber Identity Module) card 200, a modem 210, etc., where there may be one or multiple modems 210, when there are multiple modems 210, there are also a plurality of corresponding RF circuits 110. The person of ordinary skill in the art may be aware of the fact that the structure of the mobile phone shown in FIG. 1 does not constitute limitation to the mobile phone, more or less components than the components shown in the figures may be included, or certain components or different component arrangements may be combined.

The embodiments described below may be implemented on a mobile phone 100 having the aforesaid hardware structure/software architecture. The virtual SIM card acquisition method provided by the embodiments of the present disclosure will be illustrated in the embodiments described below by taking the mobile phone 100 as an example.

Figure 2:
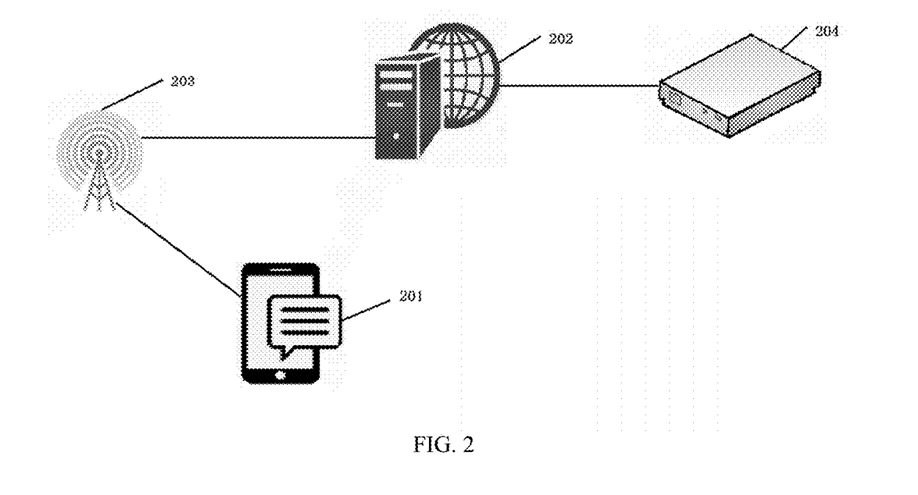
FIG. 2 is a schematic diagram of a virtual SIM card acquisition system provided by an embodiment of the present disclosure.

Referring to FIG. 2, FIG. 2 illustrates a schematic diagram of a virtual SIM card acquisition system provided by an embodiment of the present disclosure. The SIM card acquisition system includes: a subscriber terminal 201, a server 202, a base station 203 and a card pool device 204. The subscriber terminal 201 communicates with the base station 203 and the card pool device 204 through a wired and/or wireless network. The subscriber terminal 201, the server 202, the base station 203, and the card pool device 204 may implement an interaction flow described as follows:

the subscriber terminal 201 registers the wireless network with a first SIM card and establishes a connection with the server 202 through the base station 203;

the subscriber terminal 201 sends a virtual SIM card acquisition request to the server 202 based on the connection between the subscriber terminal 201 and the server 202; the virtual SIM card acquisition request carries carrier information of roaming area of the first SIM card; the virtual SIM card acquisition request is used for instructing the server 202 to determine whether there exists the virtual SIM card data of the virtual SIM card corresponding to the carrier information of the roaming area of the first SIM card in the server 202 according to the virtual SIM card acquisition request, and send the virtual SIM card data to the subscriber terminal 201, when there exists the virtual SIM card data of the virtual SIM card corresponding to the carrier information of the roaming area of the first SIM card exists in the server 202;

the subscriber terminal 201 receives the virtual SIM card data sent from the server 202 and acquires connectable carrier information of the virtual SIM card according to the virtual SIM card data;

the virtual SIM card acquisition request is sent to the server again if the connectable carrier information of the virtual SIM card is inconsistent with the carrier information of the roaming area of the first SIM card, and the acquisition of the virtual SIM card is completed when the connectable carrier information of the virtual SIM card is consistent with the carrier information of the roaming area of the first SIM card. The card pool device 204 is configured to provide a network authentication algorithm.

Figure 3:
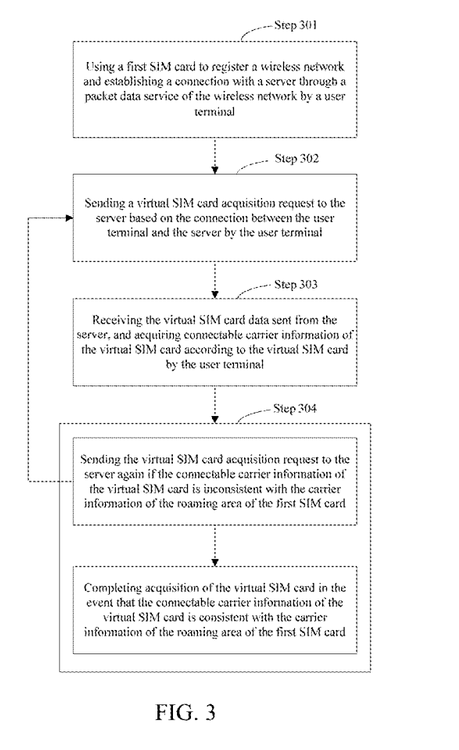
FIG. 3 is a schematic flow diagram of one virtual SIM card acquisition method provided by the present disclosure.

Based on the hardware environment mentioned above, the present disclosure provides a virtual SIM card acquisition method, the execution subject of the virtual SIM card acquisition method is the subscriber terminal, referring to FIG. 3, FIG. 3 illustrates a schematic flow diagram of a virtual SIM card acquisition method provided by the present disclosure. By way of example only and not limitation, the method may be applied to the mobile phone 100 described above.

As shown in FIG. 3, this virtual SIM card acquisition method may include the following steps:

In step 301, using the first SIM card to register the wireless network with the embedded first SIM card, and establishing a connection with the server through the packet data service of the wireless network by the subscriber terminal.

The SIM card is configured to provide the subscriber terminal 201 with a packet data service, and establish a connection with the server 202 and the base station 203 according to the packet data service. Where the SIM card may be an embedded physical SIM (Subscriber Identity Module) card, and may also be an e-SIM (Embedded Subscriber Identity Module) card, may also be a software program that can implement a relevant function of the SIM card, and may also be a physical SIM card of an external device, where the packet data service is provided by the external device. The SIM card may support a plurality of carrier's networks of roaming areas. The carrier is an entity that performs network operations and provides services.

In step 302, sending a virtual SIM card acquisition request to the server 202 by the subscriber terminal 201 based on the connection between the subscriber terminal 201 and the server 202; the virtual SIM card acquisition request carries carrier information of roaming area of the first SIM card; the virtual SIM card acquisition request is used for instructing the server 202 to search whether there exists virtual SIM card data of a virtual SIM card corresponding to the carrier information of the roaming area of the first SIM card according to the virtual SIM card acquisition request, and send the virtual SIM card data to the subscriber terminal 201, when there exists the virtual SIM card data of the virtual SIM card corresponding to the carrier information of the roaming area of the first SIM card in the server 202.

It is emphasized that the virtual SIM card is different from the embedded SIM card, where the virtual SIM card does not have a physical structure and a corresponding physical card slot in the subscriber terminal 201, instead, the virtual SIM card is merely a software program executable on a processor in the subscriber terminal 201, and the software program may implement a part or a whole of the functions of the SIM card. The virtual SIM card may be pure software architecture and may also be software and hardware combined structure. When the virtual SIM card is a software and hardware combined architecture, the physical SIM card corresponding to the virtual SIM card is arranged on the server 202 or in the card pool device 204 connected externally to the server 202, the server 202 communicates with the card pool device 204, and thereby realizing the function of the physical SIM card; the software part in the software and hardware combined architecture is a software program executing on the subscriber terminal 201, the software program may realize basic service requirements (e.g., networking, calling, short message and the like), while the functions of the hardware part are implemented by the server 202, the functions implemented by the hardware part include authentication, and the like. When the virtual SIM card is a pure software architecture, all functions of the SIM card may be realized on the subscriber terminal 201 through the software program.

As one embodiment of the present disclosure, when the virtual SIM card is the software and hardware combined architecture, a software program (i.e., virtual SIM card data) may be used to carry the subscriber identity information and the network information of the connectable carrier, and the hardware module (i.e., the physical SIM card) may be used to carry the authentication algorithm.

The subscriber terminal 201 sends a virtual SIM card acquisition request to the server 202. The virtual SIM card data is software program, and the functions of a part or a whole of the physical SIM card may be realized. The information in the virtual SIM card acquisition request includes but is not limited to information including carrier information of roaming area of the first SIM card, PLMN (Public Land Mobile Network) parameters of the SIM card, location area code (LAC), and cellid.

The virtual SIM card acquisition request is further configured to instruct the server 202 to send information of no available SIM card response to the subscriber terminal 201, when there is no virtual SIM card data of the virtual SIM card corresponding to the carrier information of the roaming area of the first SIM card in the server 202.

In step 303, receiving the virtual SIM card data sent from the server 202, and acquiring connectable carrier information of the virtual SIM card according to the virtual SIM card data by the subscriber terminal 201.

The virtual SIM card data includes but is not limited to data including an IMSI (International Mobile Subscriber Identity), an access point name, and connectable carrier information. The subscriber terminal 201 acquires the connectable carrier information of the virtual SIM card according to the virtual SIM card data.

In step 304, sending, by the subscriber terminal 201, the virtual SIM card acquisition request to the server 202 again if the connectable carrier information of the virtual SIM card is inconsistent with the carrier information of the roaming area of the first SIM card, and completing the acquisition of the virtual SIM card by the subscriber terminal 201 in the event that the connectable carrier information of the virtual SIM card is consistent with the carrier information of the roaming area of the first SIM card.

In order to avoid a server matching error, the subscriber terminal 201 needs to determine whether the connectable carrier information of the virtual SIM card is consistent with the carrier information of the roaming area of the SIM card.

If the connectable carrier information of the virtual SIM card is inconsistent with the carrier information of the roaming area of the SIM card, the steps 301 to 303 are repeatedly performed, and the acquisition of the virtual SIM card is completed in the event that the connectable carrier information of the virtual SIM card is consistent with the carrier information of the roaming area of the first SIM card.

In this embodiment, the wireless network is registered by the subscriber terminal 201 using the first embedded SIM card, a connection is established with the server 202 through a packet data service of the wireless network, the subscriber terminal 201 sends the virtual SIM card acquisition request to the server 202 and receives the virtual SIM card data sent from the server 202 based on the connection between the subscriber terminal 201 and server 202, and acquire the connectable carrier information of the virtual SIM card according to the virtual SIM card data; if the connectable carrier information of the virtual SIM card is inconsistent with the carrier information of the roaming area of the first SIM card, a virtual SIM card acquisition request is sent to the server again, and the acquisition of the virtual SIM card is completed in the event that the connectable carrier information of the virtual SIM card is consistent with the carrier information of the roaming area of the first SIM card. According to the aforesaid virtual SIM card acquisition method, different virtual SIM cards are repeatedly acquired from the server 202 until the connectable carrier information of the virtual SIM card is consistent with the carrier information of the roaming area of the first SIM card, so that the connectable carrier information of the virtual SIM card is ensured to be consistent with the carrier information of the roaming area corresponding to the first SIM card.

Figure 4:
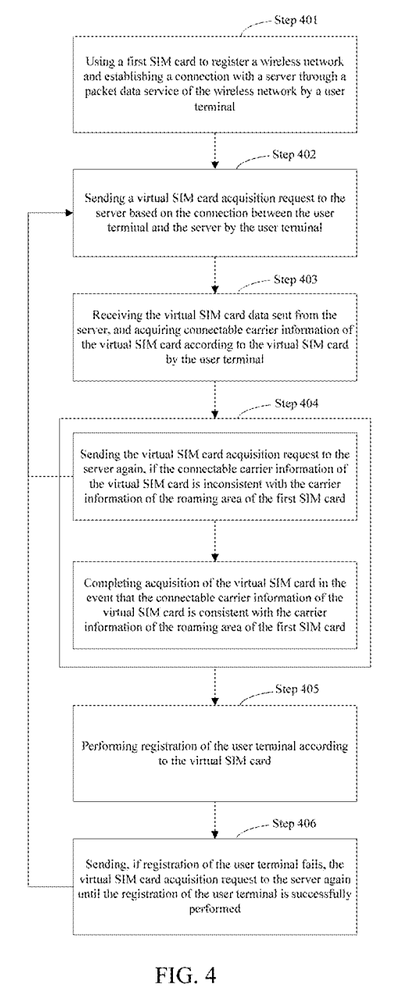
FIG. 4 is a schematic flow diagram of another virtual SIM card acquisition method provided by the present disclosure.

Optionally, on the basis of the embodiment shown in the aforesaid FIG. 3, after step 304, the virtual SIM card acquisition method further includes the following steps, referring to FIG. 4, FIG. 4 illustrates a schematic flow diagram of another virtual SIM card acquisition method provided by the present disclosure. By way of example only and not limitation, this virtual SIM card acquisition method may be applied to the mobile phone 100 described above.

As shown in FIG. 4, this method may include the following steps:

where steps 401-404 in this embodiment are as same as the steps 301-304 in the previous embodiment, regarding the details of steps 401-404, reference may be made to the related descriptions of steps 301-304 in the previous embodiment, it is not repeatedly described herein.

Step 401, registering a wireless network with an embedded first SIM card, and establishing a connection with a server 202 through a packet data service of the wireless network by a subscriber terminal 201.

Step 402, sending a virtual SIM card acquisition request to the server 202 by the subscriber terminal 201 based on the connection between the subscriber terminal 201 and the server 202; where the virtual SIM card acquisition request carries carrier information of roaming area of the first SIM card; the virtual SIM card acquisition request is used for instructing the server 202 to search whether there exists virtual SIM card data of a virtual SIM card corresponding to the carrier information of the roaming area of the first SIM card in the server according to the virtual SIM card acquisition request 202, and send the virtual SIM card data to the subscriber terminal 201, when there exists the virtual SIM card data of the virtual SIM card corresponding to the carrier information of the roaming area of the first SIM card in the server 202.

Step 403, receiving the virtual SIM card data sent from the server 202, and acquiring connectable carrier information of the virtual SIM card according to the virtual SIM card data by the subscriber terminal 201.

Step 404, sending the virtual SIM card acquisition request to the server 202 again if the connectable carrier information of the virtual SIM card is inconsistent with the carrier information of the roaming area of the first SIM card, and completing the acquisition of the virtual SIM card in the event that the connectable carrier information of the virtual SIM card is consistent with the carrier information of the roaming area of the first SIM card.

Step 405, performing a registration of the subscriber terminal 201 according to the virtual SIM card data.

The subscriber terminal 201 sends a registration request to a base station 203, and the subscriber terminal 201 is registered by the base station 203 according to the registration request.

Step 406, sending the virtual SIM card acquisition request to the server again until the subscriber terminal is successfully registered, if the registration of the subscriber terminal 201 fails.

If a registration failure message is returned by the base station 203, it indicates that the registration of the subscriber terminal 201 is failed, a virtual SIM card acquisition request to sent the server 202 again until the subscriber terminal 201 is successfully registered, thus, a situation that the subscriber terminal 201 may not be registered due to virtual SIM card data missing or server matching error is excluded.

The registration process of the subscriber terminal 201 is completed if a registration success message is returned by the base station 203.

In this embodiment, the subscriber terminal 201 is registered according to the virtual SIM card data; if registration of the subscriber terminal 201 fails, the virtual SIM card acquisition request is sent to the server 202 again until the subscriber terminal 201 is successfully registered. According to this virtual SIM card acquisition method, the virtual SIM card data may be ensured to perform service registration normally, and therefore a failure of registration caused by the condition of server matching error or data missing or the like is avoided.

Figure 5:
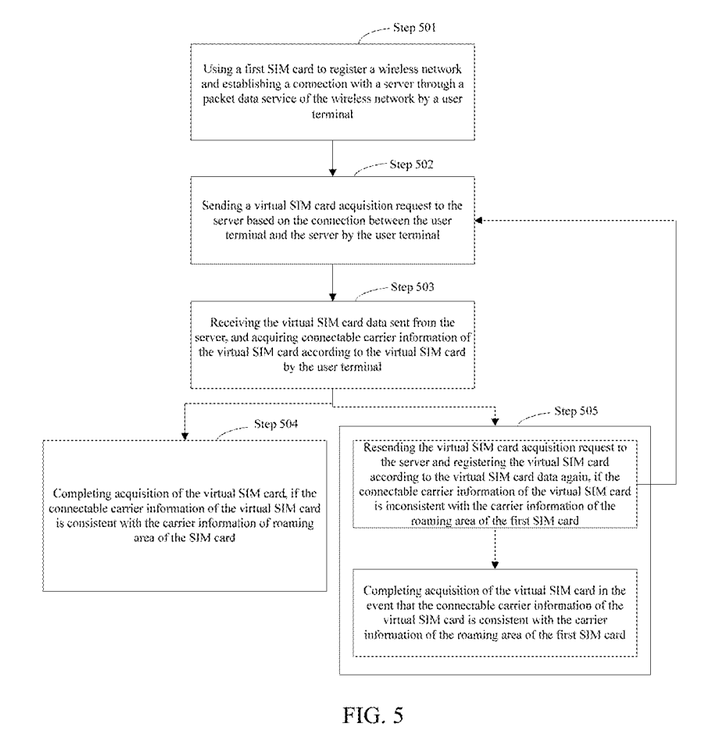
FIG. 5 is a schematic flow diagram of another virtual SIM card acquisition method provided by the present disclosure.

Optionally, on the basis of the embodiment shown in FIG. 3, after the virtual SIM card data sent from the server 202 is received and the connectable carrier information of the virtual SIM card is acquired according to the virtual SIM card data, the method further includes the following steps: referring to FIG. 5, FIG. 5 illustrates a schematic flow diagram of another virtual SIM card acquisition method provided by the present disclosure. By way of example only and not limitation, this virtual SIM card acquisition method may be applied to the mobile phone 100 described above.

As shown in FIG. 5, this method may include the following steps:

where steps 501-503 and 505 in this embodiment are as same as the steps 301-304 in the previous embodiment, regarding the details of the steps 501-503 and 505, reference may be made to the related descriptions of the steps 301-304 in the previous embodiment, it is not repeatedly described herein.

Step 501, registering a wireless network with an embedded first SIM card, and establishing a connection with a server 202 through a packet data service of the wireless network by a subscriber terminal 201.

Step 502, sending a virtual SIM card acquisition request to the server 202 by the subscriber terminal 201 based on the connection between the subscriber terminal 201 and the server 202; where the virtual SIM card acquisition request carries carrier information of roaming area of the first SIM card; the virtual SIM card acquisition request is used for instructing the server 202 to search whether there exists virtual SIM card data of a virtual SIM card corresponding to the carrier information of the roaming area of the first SIM card in the server according to the virtual SIM card acquisition request 202, and send the virtual SIM card data to the subscriber terminal 201, when there exists the virtual SIM card data of the virtual SIM card corresponding to the carrier information of the roaming area of the first SIM card in the server 202.

Step 503, receiving the virtual SIM card data sent from the server 202 and acquiring connectable carrier information of the virtual SIM card according to the virtual SIM card data by the subscriber terminal 201.

Step 504, completing acquisition of the virtual SIM card by the subscriber terminal 201, if the connectable carrier information of the virtual SIM card is consistent with the carrier information of roaming area of the SIM card.

If the connectable carrier information of the virtual SIM card is consistent with the carrier information of the roaming area of the SIM card, it indicates that the virtual SIM card carrier meets the requirement, and there is no need to repeatedly acquire the virtual SIM card data from the server 202.

In step 505, resending the virtual SIM card acquisition request to the server 202 and registering the virtual SIM card according to the virtual SIM card data again by the subscriber terminal 201 in the event that the connectable carrier information of the virtual SIM card is inconsistent with the carrier information of the roaming area of the first SIM card, and completing the acquisition of the virtual SIM card by the subscriber terminal 201 in the event that the connectable carrier information of the virtual SIM card is consistent with the carrier information of the roaming area of the first SIM card.

In the embodiment, whether the connectable carrier information of the virtual SIM card is consistent with the carrier information of the roaming area of the SIM card is determined by the subscriber terminal 201, and the acquisition of the virtual SIM card is completed by the subscriber terminal 201, if the connectable carrier information of the virtual SIM card is consistent with the carrier information of the roaming area of the SIM card. According to the virtual SIM card acquisition method mentioned above, the connectable carrier information of the virtual SIM card is ensured to be consistent with the carrier information of the roaming area of the first SIM card.

Figure 6:
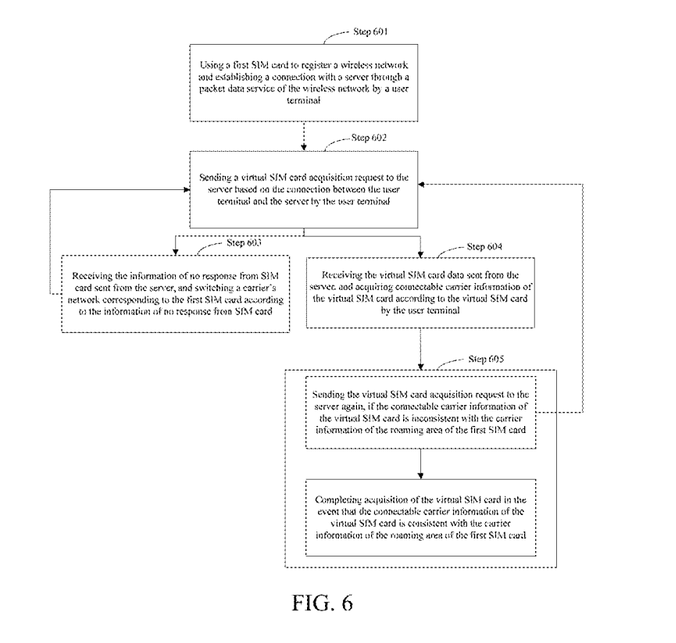
FIG. 6 is a schematic flow diagram of another virtual SIM card acquisition method provided by the present disclosure.

Optionally, on the basis of the embodiment shown above in FIG. 3, after sending, by the subscriber terminal 201, the virtual SIM card acquisition request to the server 202 based on the connection between the subscriber terminal 201 and the server 202, following steps are further included; referring to FIG. 6, FIG. 6 illustrates a schematic flow diagram of another virtual SIM card acquisition method provided by the present disclosure. By way of example only and not limitation, this virtual SIM card acquisition method may be applied to the mobile phone 100 described above.

As shown in FIG. 6, the method may include the following steps:

where steps 601-602 and steps 603-605 in this embodiment are as same as the steps 301-304 in the previous embodiment, regarding the details of the steps 601-605, reference may be made to the related descriptions of the steps 301-304 in the previous embodiment, it is not repeatedly described herein.

Step 601, registering a wireless network with an embedded first SIM card, and establishing a connection with a server through a packet data service of the wireless network by a subscriber terminal 201.

Step 602, sending, by the subscriber terminal 201, a virtual SIM card acquisition request to the server 202 based on the connection between the subscriber terminal 201 and the server 202; where the virtual SIM card acquisition request carries carrier information of roaming area of the first SIM card; the virtual SIM card acquisition request is used for instructing the server 202 to search whether there exists virtual SIM card data of a virtual SIM card corresponding to the carrier information of the roaming area of the first SIM card in the server 202 according to the virtual SIM card acquisition request, and send the virtual SIM card data to the subscriber terminal 201, when there exists the virtual SIM card data of the virtual SIM card corresponding to the carrier information of the roaming area of the first SIM card in the server 202.

Step 603, receiving information of no available SIM card response sent from the server 202, and switching to a different carrier's network supported by the first SIM card according to the information of no available SIM card response by the subscriber terminal 201, and sending the virtual SIM card acquisition request to the server 202 again by the subscriber terminal 201.

When the information of no available SIM card response sent from the server 202 is received, it indicates that there is no virtual SIM card data corresponding to the carrier information as same as that of the SIM card in the server 202. The subscriber terminal 201 may acquire the virtual SIM card data corresponding to the carrier information as same as that of the SIM card by switching to the carrier's network supported by the SIM card and sending the virtual SIM card acquisition request to the server 202 again.

In step 604, receiving the virtual SIM card data sent from the server 202, and acquiring connectable carrier information of the virtual SIM card according to the virtual SIM card data by the subscriber terminal 201.

Step 605, sending, by the subscriber terminal 201, the virtual SIM card acquisition request to the server 202 again if the connectable carrier information of the virtual SIM card is inconsistent with the carrier information of the roaming area of the first SIM card, and registering the virtual SIM card according to the virtual SIM card data again and completing the acquisition of the virtual SIM card by the subscriber terminal 201, in the event that the connectable carrier information of the virtual SIM card is consistent with the carrier information of the roaming area of the first SIM card.

In this embodiment, the information of no available SIM card response sent from the server 202 is received, and switching to a different carrier's network supported by the first SIM card is performed according to the information of no available SIM card response, and the virtual SIM card acquisition request is sent to the server 202 again. In this way, the connectable carrier information of the virtual SIM card is ensured to be consistent with the carrier information of the roaming area of the first SIM card.

Figure 7:
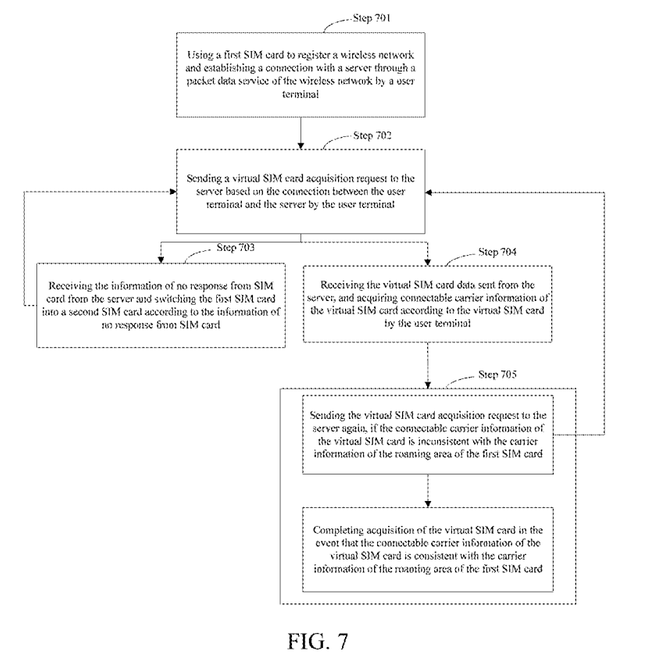
FIG. 7 is a schematic flow diagram of another virtual SIM card acquisition method provided by the present disclosure.

Optionally, on the basis of the embodiment shown above in FIG. 3, after sending, by the subscriber terminal 201, the virtual SIM card acquisition request to the server 202 based on the connection between the subscriber terminal 201 and the server 202, following steps are further included; referring to FIG. 7, FIG. 7 illustrates a schematic flow diagram of another virtual SIM card acquisition method provided by the present disclosure. By way of example only and not limitation, this virtual SIM card acquisition method may be applied to the mobile phone 100 described above.

As shown in FIG. 7, the method may include the following steps:

where steps 701-702 and steps 703-705 in this embodiment are as same as the steps 301-304 in the previous embodiment, regarding the details of the steps 701-705, reference may be made to the related descriptions of steps 301-304 in the previous embodiment, it is not repeatedly described herein.

Step 701, registering a wireless network with an embedded first SIM card and establishing a connection with a server 202 through a packet data service of the wireless network by a subscriber terminal 201.

Step 702, sending, by the subscriber terminal 201, a virtual SIM card acquisition request to the server 202 based on the connection between the subscriber terminal 201 and the server 202; where the virtual SIM card acquisition request carries carrier information of roaming area of the first SIM card; the virtual SIM card acquisition request is used for instructing the server 202 to search whether there exists virtual SIM card data of a virtual SIM card corresponding to the carrier information of the roaming area of the first SIM card in the server 202 according to the virtual SIM card acquisition request and send the virtual SIM card data to the subscriber terminal 201, when there exists the virtual SIM card data of the virtual SIM card corresponding to the carrier information of the roaming area of the first SIM card in the server 202.

Step 703, receiving information of no available SIM card response sent from the server 202, and switching to the first SIM card according to the information of no available SIM card response by the subscriber terminal 201, and sending, by the subscriber terminal 201, the virtual SIM card acquisition request to the server 202 again according to the carrier's network registered by the current SIM card of the subscriber terminal 201.

When the information of no available SIM card response sent from the server 202 is received, it indicates that there is no virtual SIM card data corresponding to the carrier information as same as that of the SIM card in the server 202. When multiple SIM cards are configured to be arranged in the subscriber terminal 201, by switching between different SIM cards and sending the virtual SIM card acquisition request to the server 202 according to the carrier's network registered by the current SIM card again, such that the virtual SIM card data corresponding to the carrier information as same as that of the SIM card may be acquired.

In step 704, receiving the virtual SIM card data sent from the server 202 and acquiring connectable carrier information of the virtual SIM card according to the virtual SIM card data by the subscriber terminal 201.

Step 705, sending the virtual SIM card acquisition request to the server 202 again if the connectable carrier information of the virtual SIM card is inconsistent with the carrier information of the roaming area of the first SIM card, and completing the acquisition of the virtual SIM card in the event that the connectable carrier information of the virtual SIM card is consistent with the carrier information of the roaming area of the first SIM card.

In this embodiment, the information of no available SIM card response sent from the server 202 is received, and switching to a different carrier's network supported by the first SIM card is performed according to the information of no available SIM card response, and the virtual SIM card acquisition request is sent to the server 202 again. In this way, the connectable carrier information of the virtual SIM card is ensured to be consistent with the carrier information of the roaming area of the first SIM card.

Figure 8:
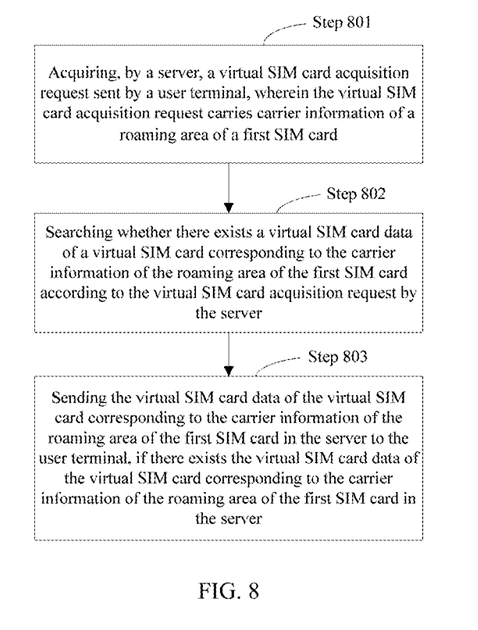
FIG. 8 is a schematic flow diagram of one virtual SIM card acquisition method provided by the present disclosure.

The present disclosure provides a virtual SIM card acquisition method, an executive subject of the virtual SIM card acquisition method is a server 202, referring to FIG. 8, FIG. 8 illustrates a schematic flow diagram of a virtual SIM card acquisition method provided by the present disclosure. By way of example only and not limitation, the method may be applied to the mobile phone 100 described above.

As shown in FIG. 8, the method may include the following steps:

step 801, receiving, by a server 202, a virtual SIM card acquisition request sent from a subscriber terminal 201, the virtual SIM card acquisition request carries carrier information of roaming area of a first SIM card.

Step 802, searching whether there exists virtual SIM card data of the virtual SIM card corresponding to the carrier information of the roaming area of the first SIM card according to the virtual SIM card acquisition request by the server 202.

Virtual SIM card data corresponding to different virtual SIM cards are stored in the server 202, the server 202 searches whether there exists the virtual SIM card data of the virtual SIM card corresponding to the carrier information of the roaming area of the first SIM card according to the virtual SIM card acquisition request, when receiving the virtual SIM card acquisition request sent by the subscriber terminal 201.

Step 803, sending, by the server 202, the virtual SIM card data of the virtual SIM card corresponding to the carrier information of the roaming area of the first SIM card to the subscriber terminal 201, if there exists the virtual SIM card data of the virtual SIM card corresponding to the carrier information of the roaming area of the first SIM card in the server 202.

In this embodiment, the virtual SIM card acquisition request sent from the subscriber terminal 201 is received by the server 202, whether there exists the virtual SIM card data of the virtual SIM card corresponding to the carrier information of the roaming area of the first SIM card is searched by the server 202 according to the virtual SIM card acquisition request, the virtual SIM card data of the virtual SIM card corresponding to the carrier information of the roaming area of the first SIM card is sent to the subscriber terminal 201, if there exists the virtual SIM card data of the virtual SIM card corresponding to the carrier information of the roaming area of the first SIM card in the server 202. In this way, matching the virtual SIM card data of the same carrier by the server 202 is realized, so that the connectable carrier information of the virtual SIM card is ensured to be consistent with the carrier information of the roaming area of the first SIM card.

Figure 9:
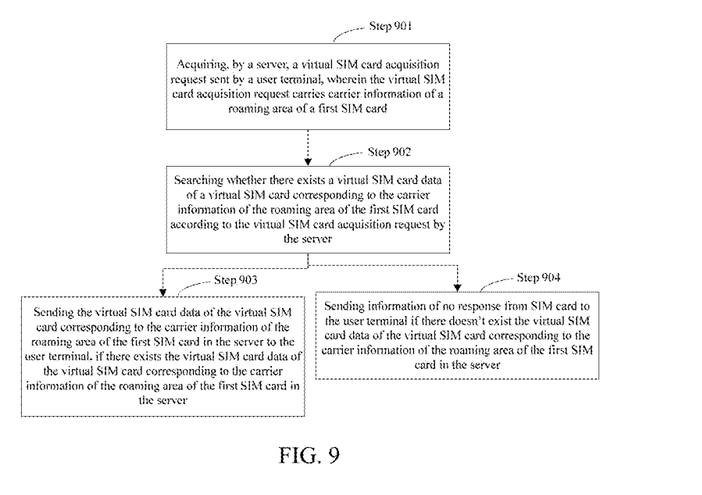
FIG. 9 is a schematic flow diagram of another virtual SIM card acquisition method provided by the present disclosure.

Optionally, on the basis of the embodiment shown above in FIG. 8, after sending the virtual SIM card acquisition request to the server 202, following steps are further included; referring to FIG. 9, FIG. 9 illustrates a schematic flow diagram of another virtual SIM card acquisition method provided by the present disclosure. By way of example only and not limitation, this virtual SIM card acquisition method may be applied to the mobile phone 100 described above.

As shown in FIG. 9, the method may include the following steps:

where steps 901-903 in this embodiment are as same as the steps 801-803 in the previous embodiment, regarding the details of the steps 901-903, reference may be made to the related descriptions of steps 801-803 in the previous embodiment, it is not repeatedly described herein.

Step 901, receiving, by a server 202, a virtual SIM card acquisition request sent from a subscriber terminal 201, the virtual SIM card acquisition request carries carrier information of roaming area of a first SIM card.

Step 902, searching whether there exists virtual SIM card data of the virtual SIM card corresponding to the carrier information of the roaming area of the first SIM card according to the virtual SIM card acquisition request by the server 202.

Step 903, sending, by the server 202, the virtual SIM card data of the virtual SIM card corresponding to the carrier information of the roaming area of the first SIM card to the subscriber terminal 201, if there exists the virtual SIM card data of the virtual SIM card corresponding to the carrier information of the roaming area of the first SIM card in the server 202.

Step 904, sending, by the server 202, information of no available SIM card response to the subscriber terminal 201, if there doesn't exist the virtual SIM card data corresponding to the carrier information of the roaming area of the first SIM card in the server 202.

In this embodiment, the information of no available SIM card response is sent to the subscriber terminal 201 when there doesn't exist the virtual SIM card data of the virtual SIM card corresponding to the carrier information of the roaming area of the first SIM card in the server 202. In this way, the connectable carrier information of the virtual SIM card is ensured to be consistent with the carrier information of the roaming area of the first SIM card.

Figure 10:
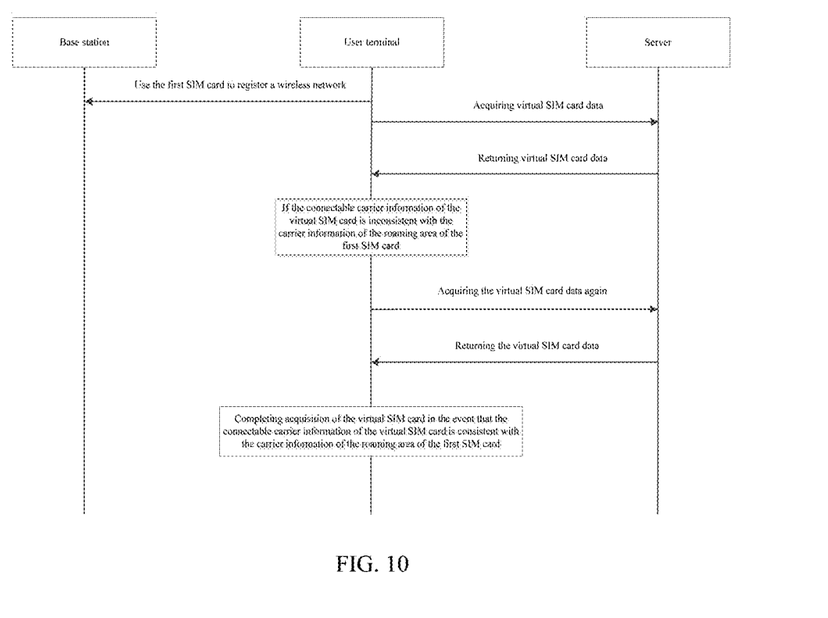
FIG. 10 is an interactive flow diagram of one virtual SIM card acquisition method provided by the present disclosure.

By way of example, FIG. 10 illustrates an interaction flow diagram of a virtual SIM card acquisition method provided by an embodiment of the present disclosure, in the interaction process, three parties of interaction process are primarily a subscriber terminal 201, a base station 203, and a server 202.

It should be understood that, value of serial number of the steps in the aforesaid embodiment doesn't mean a sequencing of execution sequences of the steps, the execution sequence of each of the steps should be determined by functionalities and internal logics of the steps themselves, and shouldn't be regarded as limitation to an implementation process of the embodiment of the present disclosure.

Figure 11:
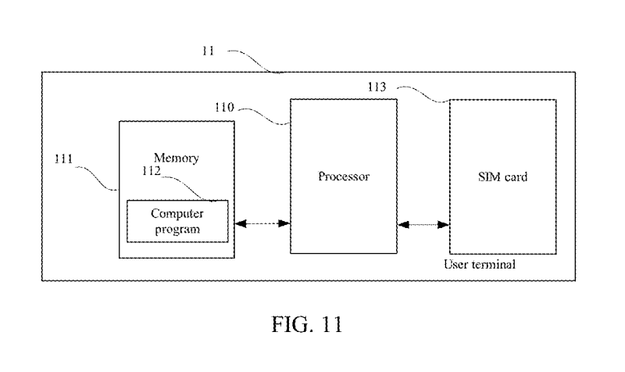
FIG. 11 is a structural schematic diagram of a subscriber terminal provided by the present disclosure.

FIG. 11 illustrates a schematic structural block diagram of a subscriber terminal 11 provided by an embodiment of the present disclosure. As shown in FIG. 11, the subscriber terminal 11 of this embodiment includes a processor 110, a memory 111, a computer program 112 stored in the memory 111 and executable by the processor 110, and a SIM card 113. In particular, the computer program 112 may be a virtual SIM card acquisition procedure. The processor 110 is configured to, when executing the computer program 112, implement the steps in the embodiments of virtual SIM card acquisition method in FIGS. 3-7 described above, such as the steps 301-304 shown in FIG. 3.

The subscriber terminal 11 registers the wireless network with the embedded first SIM card, and establishes a connection with the server 12 through the packet data service of the wireless network.

The subscriber terminal 11 sends the virtual SIM card acquisition request to the server 12 based on the connection between the subscriber terminal 11 and the server 12; the virtual SIM card acquisition request carries the carrier information of the roaming area of the first SIM card; the virtual SIM card acquisition request is used for indicating the server 12 to search whether there exists the virtual SIM card data of the virtual SIM card corresponding to the carrier information of the roaming area of the first SIM card according to the virtual SIM card acquisition request and send the virtual SIM card data to the subscriber terminal 11, when there exists the virtual SIM card data of the virtual SIM card corresponding to the carrier information of the roaming area of the first SIM card in the server 12;

The subscriber terminal 11 receives the virtual SIM card data sent from the server 12, and acquires the connectable carrier information of the virtual SIM card according to the virtual SIM card data.

The virtual SIM card acquisition request is sent to the server 12 again if the connectable carrier information of the virtual SIM card is inconsistent with the carrier information of the roaming area of the first SIM card, and the acquisition of the virtual SIM card is completed in the event that the connectable carrier information of the virtual SIM card is consistent with the carrier information of the roaming area of the first SIM card.

Figure 12:
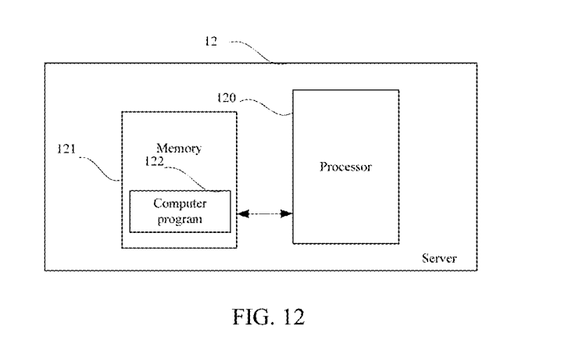
FIG. 12 illustrates a structural schematic diagram of a server provided by the present disclosure.

FIG. 12 illustrates a schematic structural block diagram of a server 12 provided by an embodiment of the present disclosure. As shown in FIG. 12, the server 12 in this embodiment includes a processor 120, a memory 121, a computer program 122 stored in the memory 121 and executable by the processor 120; for example, the computer program 122 may be a virtual SIM card acquisition program. The processor 120 is configured to, when executing the computer program, implement the steps in the embodiments of the virtual SIM card acquisition methods in FIGS. 8-9 described above, such as the steps 801-803 shown in FIG. 8.

The server 12 receives the virtual SIM card acquisition request sent from the subscriber terminal 11, the virtual SIM card acquisition request carries the carrier information of the roaming area of the first SIM card;

the server 12 searches whether there exists the virtual SIM card data of the virtual SIM card corresponding to the carrier information of the roaming area of the first SIM card therein according to the virtual SIM card acquisition request;

The virtual SIM card data of the virtual SIM card corresponding to the carrier information of the roaming area of the first SIM card is sent to the subscriber terminal 11, if there exists the virtual SIM card data of the virtual SIM card corresponding to the carrier information of the roaming area of the first SIM card in the server 12.

Exemplarily, the aforesaid computer program 112 may be divided into one or a plurality of units, the one or plurality of units are stored in the memory 131 or the memory 121, and is/are executed by the processor 120 so as to implement the present disclosure. The one or plurality of units may be a series of computer program instruction segments that may accomplish particular functionalities, these instruction segments are used for describing an executive process of the computer program 122 in the subscriber terminal 11 or describing an executive process of the computer program 122 in the server 12.

The subscriber terminal 11 or the server 12 may be a computing device such as a desktop computer, a laptop, a tablet and the like, it may be understood for the person of ordinary skill in the art that, FIG. 11 is merely an example of the subscriber terminal 11, FIG. 12 is merely an example of the server 12, which should not be regarded as limitation to the subscriber terminal 11 and the server 12, more or less components shown in FIGS. 11 and 12 may be included, or some components or different components may be combined; for example, the subscriber terminal 11 and the server 12 may include an input and output device, a network access device, a bus, etc.

In this embodiment of the present disclosure, the processor 110 or the processor 120 may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor may also be any conventional processor and the like.

The memory 111 or the memory 112 may be an internal storage unit of the subscriber terminal 11 or the server 12, such as a hard disk or a memory of the subscriber terminal 11 or the server 12. The memory 111 or the memory 121 may also be an external memory of the subscriber terminal 11 or the server 12, such as a plug-in hard disk, a SMC (Smart Media Card), a SD (Secure Digital) card, a FC (Flash Card) equipped on the measuring device 10. Further, the memory 111 or the memory 112 may not only include the internal storage unit of the subscriber terminal 11 or the server 12 but also include the external storage device of the subscriber terminal 11 or the server 12. The memory 111 or the memory 112 is configured to store the computer program, and other procedures and data needed by the subscriber terminal 11. The memory 111 or the memory 112 may also be configured to store data that has been output or being ready to be output temporarily.

The SIM (Subscriber Identity Module) card 113 includes a CPU, a ROM for storing programs, a working RAM (Random Access Memory), a data EEPROM (Electronic Erasable Programmable Read Only Memory), and a serial communication unit. The SIM card 113 stores contents including digital mobile telephone customer information, an encrypted secret key and a telephone book, which may be provided for authenticating the identity of a network customer and encrypting voice information when the customer is making a call.

In the embodiments of the present disclosure, the descriptions of the embodiments in the present disclosure are emphasized respectively, regarding the part in some embodiments which is not described in detail, reference can be made to related descriptions in other embodiments.

If the integrated unit is achieved in the form of software functional units, and is sold or used as an independent product, it can be stored in a computer readable storage medium. Based on this understanding, a whole or part of flow process of implementing the method in the aforesaid embodiments of the present disclosure can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present disclosure. Although the present disclosure has been explained in detail with reference to the above-described embodiments, it should be understood by the ordinary skilled one in the art that, the technical solutions described in each of the embodiments mentioned above can still be amended, or some technical features in the technical solutions can be replaced equivalently; these amendments or equivalent replacements, which doesn't cause the essence of corresponding technical solution to be broken away from the spirit and the scope of the technical solution in various embodiments of the present disclosure, should all be included in the protection scope of the present disclosure.

What is claimed is:

1. A virtual SIM card acquisition method, comprising:

using a first SIM card to register a wireless network and establishing a connection with a server through a packet data service of the wireless network by a subscriber terminal;

sending a virtual SIM card acquisition request to the server based on the connection between the subscriber terminal and the server by the subscriber terminal; wherein the virtual SIM card carries carrier information of a roaming area of the first SIM card; the virtual SIM card acquisition request is used for instructing the server to search whether there exists virtual SIM card data corresponding to the carrier information of the roaming area of the first SIM card in the server according to the virtual SIM card acquisition request and send the virtual SIM card data to the subscriber terminal, when there exists the virtual SIM card data corresponding to the carrier information of the roaming area of the first SIM card in the server;

receiving the virtual SIM card data sent from the server, and acquiring connectable carrier information of the virtual SIM card according to the virtual SIM card by the subscriber terminal; and sending the virtual SIM card acquisition request to the server again if the connectable carrier information of the virtual SIM card is inconsistent with the carrier information of the roaming area of the first SIM card, and completing acquisition of the virtual SIM card if the connectable carrier information of the virtual SIM card is consistent with the carrier information of the roaming area of the first SIM card.

2. The virtual SIM card acquisition method according to claim 1, further comprising:

performing registration of the subscriber terminal according to the virtual SIM card, and sending, if the registration of the subscriber terminal fails, the virtual SIM card acquisition request to the server again until the registration of the subscriber terminal is successfully performed, after completing the acquisition of the virtual SIM card.

3. The virtual SIM card acquisition method according to claim 1, wherein the virtual SIM card acquisition request is further configured to instruct the server to send information of no available SIM card response to the subscriber terminal, when there doesn't exist the virtual SIM card data corresponding to the carrier information of the roaming area of the first SIM card in the server.

4. The virtual SIM card acquisition method according to claim 3, wherein the subscriber terminal comprises a plurality of SIM cards, the method further comprises:

receiving the information of no available SIM card response from the server and switching the first SIM card to a second SIM card according to the information of no available SIM card response, and sending the virtual SIM card acquisition request to the server again over a wireless network registered by the second SIM card, after sending a virtual SIM card acquisition request to the server based on the connection between the subscriber terminal and the server by the subscriber terminal.

5. The virtual SIM card acquisition method according to claim 3, wherein the virtual SIM card data comprises an international mobile subscriber identity, an access point name, and the connectable carrier information.

6. The virtual SIM card acquisition method according to claim 1, further comprising:

receiving the information of no available SIM card response sent from the server, and switching to a different carrier's network supported by the first SIM card according to the information of no available SIM card response, and sending the virtual SIM card acquisition request to the server again by the subscriber terminal, after sending a virtual SIM card acquisition request to the server based on the connection between the subscriber terminal and the server by the subscriber terminal.

7. A subscriber terminal, comprising a SIM card, a memory, a processor and a computer program stored in the memory and executable by the processor, wherein the processor is configured to, when executing the computer program, implement following method steps:

using a first SIM card to register a wireless network and establishing a connection with a server through a packet data service of the wireless network by a subscriber terminal;

sending a virtual SIM card acquisition request to the server based on the connection between the subscriber terminal and the server by the subscriber terminal; wherein the virtual SIM card carries carrier information of a roaming area of the first SIM card; the virtual SIM card acquisition request is used for instructing the server to search whether there exists virtual SIM card data corresponding to the carrier information of the roaming area of the first SIM card in the server according to the virtual SIM card acquisition request, and send the virtual SIM card data to the subscriber terminal when there exists the virtual SIM card data corresponding to the carrier information of the roaming area of the first SIM card in the server;

receiving the virtual SIM card data sent from the server, and acquiring connectable carrier information of the virtual SIM card according to the virtual SIM card by the subscriber terminal; and sending the virtual SIM card acquisition request to the server again if the connectable carrier information of the virtual SIM card is inconsistent with the carrier information of the roaming area of the first SIM card, and completing acquisition of the virtual SIM card if the connectable carrier information of the virtual SIM card is consistent with the carrier information of the roaming area of the first SIM card.

8. The subscriber terminal according to claim 7, wherein the processor is further configured to, when executing the computer program, implement following steps:

performing registration of subscriber terminal according to the virtual SIM card; and sending, if registration of the subscriber terminal fails, the virtual SIM card acquisition request to the server again until the registration of subscriber terminal is successfully performed.

9. The subscriber terminal according to claim 7, wherein the processor is further configured to, when executing the computer program, implement following steps: completing the acquisition of the virtual SIM card, if the connectable carrier information of the virtual SIM card is consistent with the information of the roaming area of the first SIM card.

10. The subscriber terminal according to claim 7, wherein the virtual SIM card acquisition request is further configured to instruct the server to send information of no available SIM card response to the subscriber terminal, when there doesn't exist the virtual SIM card data corresponding to the carrier information of the roaming area of the first SIM card in the server.

11. The subscriber terminal according to claim 10, wherein when executing the computer program, the processor is further configured to implement following steps: receiving the information of no available SIM card response sent from the server, and switching to a different carrier's network supported by the first SIM card according to the information of no available SIM card response, and sending the virtual SIM card acquisition request to the server again.

12. The subscriber terminal according to claim 10, wherein the processor is further configured to, when executing the computer program, implement following steps: receiving the information of no available SIM card response from the server and switching the first SIM card to a second SIM card according to the information of no available SIM card response, and sending the virtual SIM card acquisition request to the server again over a wireless network registered by the second SIM card.

13. The subscriber terminal according to claim 7, wherein the virtual SIM card data comprises an international mobile subscriber identity, an access point name, and the connectable carrier information.

14. A server, comprising a memory, a processor and a computer program stored in the memory and executable by the processor, wherein the processor is configured to, when executing the computer program, implement following method steps:

acquiring, by the server, a virtual SIM card acquisition request sent from a subscriber terminal, wherein the virtual SIM card acquisition request carries carrier information of a roaming area of a first SIM card;

searching, by the server, whether there exists virtual SIM card data of a virtual SIM card corresponding to the carrier information of the roaming area of the first SIM card according to the virtual SIM card acquisition request; and sending, if there exists virtual SIM card data of the virtual SIM card corresponding to the carrier information of the roaming area of the first SIM card in the server, the virtual SIM card data of the virtual SIM card corresponding to the carrier information of the roaming area of the first SIM card in the server to the subscriber terminal.

15. The server according to claim 14, wherein the processor is further configured to, when executing the computer program, implement following steps:

sending information of no available SIM card response to the subscriber terminal, if there doesn't exist the virtual SIM card data of the virtual SIM card corresponding to the carrier information of the roaming area of the first SIM card in the server.

* * * * *